United States Patent [19]

Lesher et al.

[11] 4,344,553
[45] Aug. 17, 1982

[54] WELDING WIRE FEED DEVICE

[75] Inventors: Howard D. Lesher, Woodland Hills; James T. Taff, Simi Valley, both of Calif.

[73] Assignee: Dimetrics, Inc., Diamond Springs, Calif.

[21] Appl. No.: 234,614

[22] Filed: Feb. 17, 1981

[51] Int. Cl.³ .......................................... B65H 51/02
[52] U.S. Cl. .................................. 226/168; 219/60 A; 226/176; 226/188; 226/190; 226/194; 226/196; 242/157 R
[58] Field of Search ............... 226/168, 176, 177, 181, 226/183, 186, 187, 188, 190, 194, 196, 197, 200; 219/60 A; 242/157 R

[56] References Cited

U.S. PATENT DOCUMENTS

| | | | |
|---|---|---|---|
| 3,743,812 | 7/1973 | Peyrot | 219/60 A |
| 3,809,366 | 5/1974 | Crees | 226/168 X |
| 3,961,735 | 6/1976 | Finlay et al. | 226/168 |
| 4,009,360 | 2/1977 | Beetham | 219/60 A |
| 4,143,257 | 3/1979 | Hermann | 219/60 A |
| 4,176,269 | 11/1979 | Merrick et al. | 219/60 A |
| 4,187,022 | 2/1980 | Walter | 226/168 X |
| 4,199,673 | 4/1980 | Thiebaut et al. | 219/60 A |

FOREIGN PATENT DOCUMENTS 1068124 5/1967 United Kingdom ............... 226/168

Primary Examiner—Stanley N. Gilreath
Attorney, Agent, or Firm—Ralph B. Pastoriza

[57] ABSTRACT

A compact welding wire feed device is provided capable of being mounted directly on a welding head carriage. The device comprises a ball bearing having an inside race with tangential entrance and exit guides to the race adjacent to opposite axial ends of the bearing. A hub member has an outside diameter less than the inside diameter of the race so that the hub member can be coaxially received in the race and a welding wire passed through the entrance guide and wrapped around the hub and out the exit guide. By now side-loading or expanding the hub against the inside of the race and driving the hub rotationally, the welding wire is continuously fed out the exit guide. The coaxial relationship of the hub and race provides for a very compact structure thereby permitting mounting of the wire feed directly on a welding head carriage adjacent to a weld head or even permitting the feed wire itself to be used as an electrode in a MIG welding system. In certain applications, the bearing itself may be used without the hub simply to form a ninety degree bend in the weld wire with substantially no friction for proper positioning and guiding of the wire.

7 Claims, 5 Drawing Figures

WELDING WIRE FEED DEVICE

This invention relates generally to welding operations and more particularly to an improved welding wire feed device.

BACKGROUND OF THE INVENTION

Conventional welding wire feed systems usually employ a pair of "pinch" rollers between which the welding wire is fed. While it is possible to provide the pinch rollers and motor for driving the same in a convenient position relative to a torch in in-shop welding applications, the wire feed control mechanism cannot always be easily accommodated in certain "in-place" welding operations. For example, in my co-pending patent application Ser. No. 211,359 filed Nov. 26, 1980 and entitled FULL FUNCTION IN-PLACE WELD HEAD there is described a very compact welding configuration for welding about pipes in awkward locations. The particular welding apparatus described utilizes a horseshoe-shaped rotating carriage for carrying the welding torch and certain other controls for movement of the torch head as well as the horseshoe carriage structure about the pipe to be welded. The configuration is designed to be very compact in the axial direction of the pipe to be welded so that where curved pipe portions are involved, the "in-place" welding feature can be realized.

In a welding structure of the foregoing type, it would be very difficult to accommodate the feed rollers and feed motor drive for the feed wire assembly on the welding head carriage. Rather, this structure is normally provided in a separate housing and an elongated guide tube utilized to feed the wire to the welding head carriage and welding torch. This tube normally ends in a ninety degree turn to properly position the wire. The feed rollers thus are essentially "pushing" the wire and because of the guide tube length and ninety degree bend, large friction can develop and complications can ensue in attempting to control the proper feed rate. It would be far more advantageous if the lengths of wire passing from the feed rollers could be kept as short as possible, so that essentially the feeding of the wire is effected by a "pulling" of wire from a remote supply reel into the torch.

BRIEF SUMMARY OF THE INVENTION

With the foregoing considerations in mind, the present invention contemplates an improved welding wire feed device so designed as to be sufficiently compact that it can be readily carried directly on a travelling carriage for a welding head as utilized in "in-place" welding systems.

More particularly, rather than utilizing pinch rollers on either side of the welding wire to feed the same, a single ball bearing is provided with an inside race provided with generally tangential entrance and exit guides adjacent to opposite axial ends of the bearing. A hub member of outside diameter less than the inside diameter of the race is coaxially positioned in the race, a welding feed wire then being passed through the entrance guide and wrapped about the hub in the annular space between the exterior of the hub and the interior of the race to pass out the exit guide. Means are provided for side-loading or expanding the hub against the inside surface of the race to clamp the wire between the hub and race so that by providing a positive driving rotation force on the hub, the feed wire is positively driven out the exit guide in a carefully controlled manner. The axial extent of the race and hub can be minimized so that the entire structure can readily be accommodated on a weld head carriage structure. As a consequence, long guide tubes with ninety degree bends and the lide feeding wire from a remote wire feed to a welding head can be avoided and better control of the welding wire itself assured.

The bearing without the hub can be used to simply form a ninety degree bend in the weld wire with substantially no friction in certain applications where a remote feed mechanism is used.

BRIEF DESCRIPTION OF THE DRAWINGS

In the drawings.

A better understanding of this invention as well as further features and advantages thereof will be had by now referring to the accompanying drawings in which.

DETAILED DESCRIPTION OF THE PREFERRED EMBODIMENT

Figure 1:
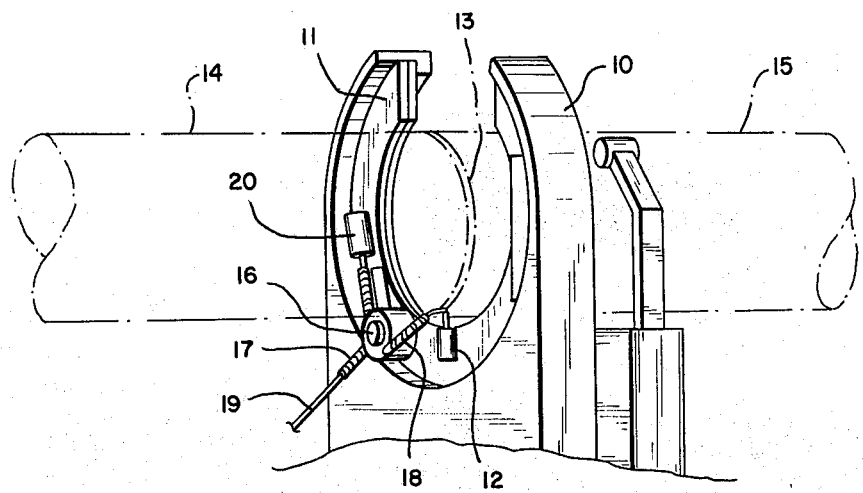
FIG. 1 is a fragmentary perspective view of an in-place welding head system utilizing the wire feed control device of this invention.

Referring first to FIG. 1, there is shown at 10 an in-place welding structure similar to that shown and described in my heretofore referred-to copending patent application. Essentially, the structure 10 includes a horseshoe-shaped travelling carriage 11 supporting an appropriate welding head 12. Travelling carriage 11 rotates within the structure 10 to carry the welding head 12 over a path indicated by the phantom lines 13. This path would be a welding path to connect pipe sections 14 and 15 also shown in phantom lines.

Because of the relatively small size of the travelling carriage, in order that in-place welding can be accomplished, the normal wire feed would be located at a remote point and the wire itself fed to the welding torch through a long flexible guide tube.

With the wire feed of the present invention, however, the same can be mounted directly on the carriage 11 without increasing the overall dimensions of the in-place weld structure.

Still referring to FIG. 1, the improved welding wire feed device is indicated at 16 provided with an entrance guide 17 and an exit guide 18. Welding wire 19 from a remote supply can be fed directly into the entrance guide 17 and "pulled" by the feed device 16 from the source and then urged out the exit guide 12 in a controlled manner. The motor for driving the wire feed is indicated at 20 and because again of the compact configuration and design of the same, this motor can also be carried directly on the welding carriage 11.

Figure 2:
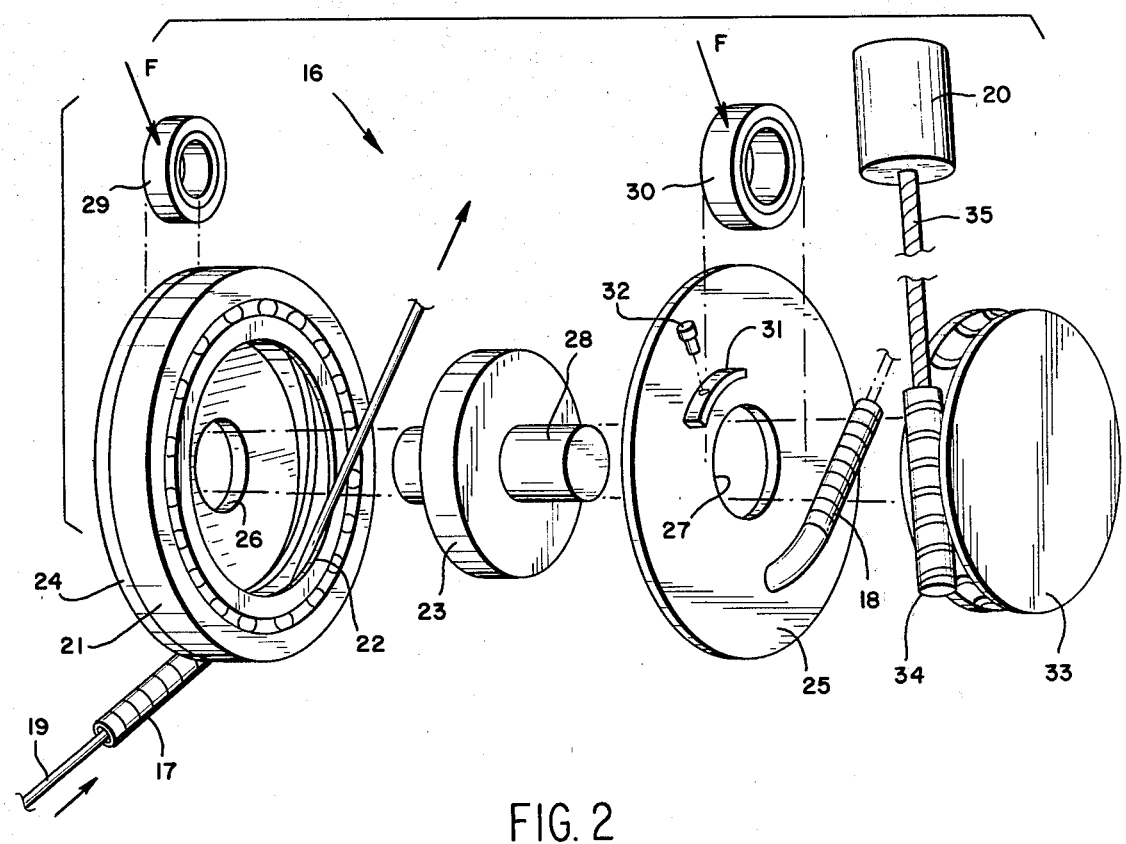
FIG. 2 is a greatly enlarged exploded view of the basic components making up the device used in FIG. 1.

Referring now to the exploded view of FIG. 2, details of the welding wire feed device described in FIG. 1 will be evident. Referring to the left portion of the drawing, the device includes a ball bearing 21 having an inside race 22 with the entrance guide 17 for the welding wire 19 being generally tangential to the race at one axial end of the bearing. A hub member 23 of outside diameter less than the inside diameter of the race 22 is arranged to be coaxially positioned in the race so that the welding feed wire 19 can pass through the entrance guide 17 and wrap around the hub in the annular space between the exterior of the hub and the interior of the race.

In FIG. 2, the welding wire 19 is shown extending about the interior of the race 22 rather than wrapped about the hub 23 but such is only because of the exploded position of the hub relative to the race. When the hub is coaxially positioned in the race, the wire will pass about the annular space between the hub and race as described.

Appropriate end plates shown at 24 and 25 are provided for the bearing 21 each having central openings 26 and 27 for receiving the ends of a shaft 28 for the hub 23.

With respect to the foregoing, the openings 26 and 27 in the end plates are of larger diameter than the shaft 28 the reason for which will become clearer as the description proceeds. The end plates 24 and 25 serve to support the entrance guide tube 17 and the exit guide tube 18 in the heretofore referred-to generally tangential positions to the inside race 22.

Shown exploded above and on either side of the end plates 24 and 25 are bearings 29 and 30 arranged to receive the ends of the shaft 28 for the hub 23 when the components are assembled. These bearings 29 and 30 permit the application of a side loading force indicated by the arrows F to be applied to the hub against the inner race 22 of the bearing to thereby clamp the wire and provide a positive driving of the wire out of the exit guide 18 when the hub is rotated.

In the particular example illustrated in FIG. 2, this side force may be provided by an appropriate flexible flange 31 on the end plate 25 and set screw 32 threadedly received in the flange 31 in a direction to bear against the bearing 30 and apply the sidewise force. A resilient spring structure can be interposed between the end of the set screw 32 and bearing 30 so that a spring biasing force provides the side loading which can be adjusted by the degree of threading of the set screw. Alternatively, the flange 31 could be flexible so as to bend under pressure of the end of the set screw against the bearing thereby providing in essence a resilient type of force.

The bearing 29 is similarly urged by a flange and set screw arrangement on the other opposed plate 24 of FIG. 2 this structure not being visible in the view taken. It will be understood that the side loading of the hub is in a direction at right angles to the hub axis.

The remaining portion of the wire feed device takes the form of an appropriate means to drive or rotate the hub and thus feed the wire at a desired rate. A preferred means for carrying out this rotation of the hub takes the form of a worm gear shown to the right of FIG. 2 at 33 arranged to be secured to the end of the hub 28 passing through the opening 27 of the end plate 25. A worm 34 is in meshing engagement with the worm gear 33 and a flexible cable 35 can be connected between the worm 34 and the driving motor 20 described in FIG. 1 to rotate the worm and thus drive the worm gear 33.

Figure 3:
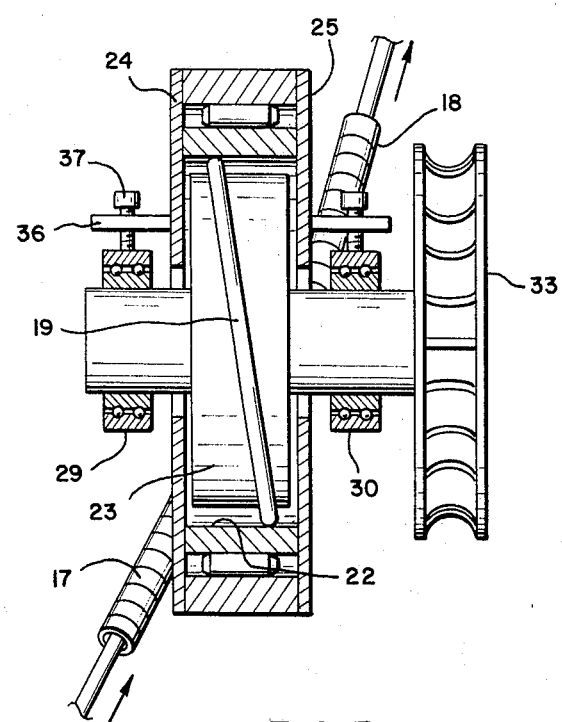
FIG. 3 is a cross section of the components of FIG. 2 in assembled relationship with certain components shown in full lines for purposes of clarity.

The foregoing description of the wire feed device will become clearer by referring to the assembled cross section of FIG. 3 wherein it will be noted that the entire structure is relatively compact. In FIG. 3, the flange 36 and set screw 37 for the end plate 24 not visible in FIG. 2 is illustrated for applying the side loading to the hub shaft.

In operation, the wire feed device can be conveniently mounted on the travelling carriage 11 as shown and described in FIG. 1. As also previously described, the motor 20 can similarly be mounted on this carriage so that there is no necessity for flexing of the flexible cable 35 upon rotational movement of the carriage. Motor 20 can be servo-controlled to thereby control the rate of wire feed in a known manner.

While the welding structure in FIG. 1 utilizes a separate welding electrode in the weld head, it should be understood that by making the exit guide 18 a conductive contact tube, the welding wire itself can serve as a welding electrode in a MIG system.

It is to be appreciated that, because of the coaxial relationship between the hub and the race, the desired compact configuration can be achieved. Moreover, there is a relatively larger area of "pinching" engagement between the exterior of the hub and the inner surface of the race on the wire when the same is wrapped about the hub as shown and described so that a more positive and thus a more accurate controlled feeding of the wire out the exit tube 18 can be realized.

It will be understood, accordingly, that while the invention has been described for use with an in-place welding head wherein small dimensions are disirable, the welding wire feed device of this invention can be used with any conventional type welding equipment and at any desired location.

With respect to the foregoing, there are instances in which the normal feed mechanism can be used but there still exists the problem of forming a ninety degree bend in the wire. Rather than introduce friction resulting from a bent guide tube, the bearing of this invention can be used without the hub to form the wire into a ninety degree bend.

Figures 4, 5:
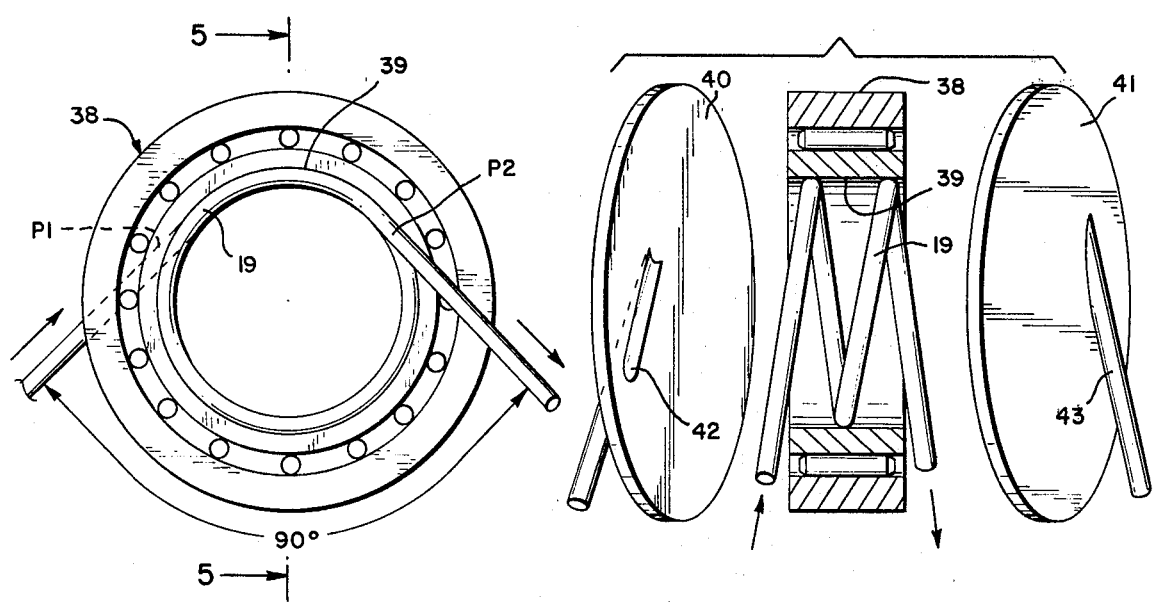
FIG. 4 is a front view of a bearing without a hub.
FIG. 5 is a cross-section along the lines 5—5 of FIG. 4 but showing the weld wire in full lines and side plates in exploded perspective.

FIGS. 4 and 5 illustrate such a bearing at 38 having an inside race 39 and side plates 40 and 41 as best shown in FIG. 2 defining an entrance guide 42 and an exit guide 43. These guides are respectively tangential to the inside race 39 at opposite side points P1 and P2 spaced circumferentially ninety degrees as measured about the inside of the race as shown in FIG. 4.

With the foregoing arrangement, the weld wire 19 will have formed therein a ninety degree bend as it is urged through the inside race, this race turning with movement of the wire to minimize friction.

I claim:

1. A welding wire feed device including, in combination:
   (a) a ball bearing having an inside rotatable race; and
   (b) side plates defining an entrance guide and an exit guide respectively tangential to said race at opposite side points spaced circumferentially as measured about the inside of the race whereby a welding wire passing through said entrance guide and about the inside of the race and out said exit guide will have a bend formed therein as the wire is urged through the inside race, the inside race turning with movement of the wire so that friction is minimized.

2. The subject matter of claim 1, including a hub member of outside diameter less than the inside diameter of said race; means for side-loading said hub against said race to thereby clamp the wire between the hub and race; and means for rotating said hub to thereby continuously feed wire out of said exit guide.

3. The subject matter of claim 1, in which said circumferential spacing is ninety degrees.

4. A welding wire feed device including, in combination:
   (a) a ball bearing having an inside rotatable race with generally tangential entrance and exit guides to the race adjacent to opposite axial ends of the bearing;
   (b) a hub member of outside diameter less than the inside diameter of said race so that when said hub member is coaxially positioned in said race, a welding feed wire can pass through said entrance guide and wrap around the hub in the annular space between the exterior of the hub and interior of the race and pass out said exit guide;
   (c) means for side loading said hub against said bearing race to thereby clamp the wire between the hub and race; and,
   (d) means for rotating the hub to thereby continuously feed wire out said exit guide.

5. The subject matter of claim 4, in which said bearing is provided with opposed end plates, one end plate supporting said entrance guide and the other end plate supporting said exit guide; said hub having a shaft extending axially from each end, said end plates having openings of greater diameter than said shaft through which said shaft passes; and bearings on the extending ends of said shaft, said means for side loading said hub comprising means on the end plate and cooperating movable means engaging the bearings for urging the bearings in like directions at right angles to the axis of the hub and shaft.

6. The subject matter of claim 5, in which said means for rotating said hub includes a worm gear secured to the hub shaft; a motor; a worm threadedly engaging said worm gear; and a flexible cable connecting said worm to said motor for driving said worm when said motor is energized, whereby the welding wire feed device can be mounted on a welding head carriage in convenient position for feeding welding wire in a welding operation.

7. The subject matter of claim 6, in which said exit guide is of a conductive material so that the same can be used as a contact tube for introducing welding current in a MIG welding system.

* * * * *